(12) United States Patent
Ivashin et al.

(10) Patent No.: US 9,256,393 B2
(45) Date of Patent: Feb. 9, 2016

(54) METHOD FOR REMOTE DESKTOP CONTROL BY REMOTE HOST INPUT DEVICES

(75) Inventors: Victor Ivashin, Danville, CA (US); Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 1084 days.

(21) Appl. No.: 13/332,751

(22) Filed: Dec. 21, 2011

(65) Prior Publication Data
US 2013/0166629 A1    Jun. 27, 2013

(51) Int. Cl.
    *G06F 15/16*    (2006.01)
    *G06F 3/14*    (2006.01)
    *H04L 29/06*    (2006.01)
    *H04L 29/08*    (2006.01)

(52) U.S. Cl.
    CPC .............. *G06F 3/1454* (2013.01); *H04L 63/08* (2013.01); *H04L 63/10* (2013.01); *H04L 67/125* (2013.01); *H04L 67/42* (2013.01)

(58) Field of Classification Search
    CPC ....... H04L 67/12; H04L 67/125; H04L 63/08; H04L 63/10; H04L 67/42; G06F 9/4445; G06F 3/038; G06F 3/1454
    USPC ........................................................ 709/227
    See application file for complete search history.

(56) References Cited

U.S. PATENT DOCUMENTS

| | | | |
|---|---|---|---|
| 7,716,273 B2 | 5/2010 | Soin et al. | |
| 8,667,144 B2* | 3/2014 | Dharmaraju et al. | ......... 709/227 |
| 8,863,237 B2* | 10/2014 | Pahlavan | ............... G06F 9/4445 |
| | | | 709/203 |
| 9,106,696 B2* | 8/2015 | Pahlavan | ............... G06F 9/4445 |
| 2004/0255029 A1 | 12/2004 | Manion et al. | |
| 2010/0180210 A1* | 7/2010 | Toyama et al. | ............... 715/750 |
| 2010/0268828 A1* | 10/2010 | Pahlavan | ............... G06F 9/4445 |
| | | | 709/227 |
| 2010/0268939 A1* | 10/2010 | Pahlavan | ............... G06F 9/4445 |
| | | | 713/155 |
| 2010/0268941 A1* | 10/2010 | Pahlavan | ............... G06F 9/4445 |
| | | | 713/155 |
| 2012/0054640 A1* | 3/2012 | Nancke-Krogh | ............. 715/751 |
| 2012/0054671 A1* | 3/2012 | Thompson et al. | ........... 715/784 |
| 2013/0111561 A1* | 5/2013 | Kaushik | ............................. 726/4 |

* cited by examiner

*Primary Examiner* — Kristie Shingles

(57) ABSTRACT

A system for establishing a remote desktop connection between a client projector and a host computer, the client projector and the host computer being connected by a network. A private remote desktop service virtual channel is established between the host computer and the client projector. In the client projector, a processor initiates a remote desktop connection process, and completes a remote desktop connection to the host computer. The client projector receives keyboard and mouse events from the host computer across the private remote desktop service virtual channel. The keyboard or mouse events received by the client projector are injected into an operating system of the client projector. They are interpreted by a client application remote desktop connection as a valid input device event, and forwarded to the host computer to actuate a graphical user interface of a remote desktop session.

20 Claims, 3 Drawing Sheets

METHOD FOR REMOTE DESKTOP CONTROL BY REMOTE HOST INPUT DEVICES

FIELD OF INVENTION

The present invention relates generally to the Remote Desktop Services components (formerly Terminal Services) of Microsoft Windows® operating systems, and pertains specifically to establishment of a remote desktop connection with user control of the hosted remote desktop session's desktop through input devices located on the host system.

BACKGROUND

Video projectors are a widely used display device in conference rooms, classrooms, home theaters, commercial signage, and many other locations. They can provide a large screen display solution where the costs of similar sized conventional monitor devices are prohibitive. Projection based technologies vary, but the core function is the same among all display devices: to output a view of some input video signal. Generally this involves a physical coupling of an output of a source device to an appropriate input on the display device.

Projector placement relative to the display surface can vary the output image size and appearance. Short-throw projector technologies allow the projector to be placed near the display surface while conventional solutions might require a much further distance between the projector and the screen. In either case, devices providing video signals to the projector must be connected to the projector inputs. These video interconnections can be problematic when a projector is difficult to reach, such as mounted high in a ceiling to provide an unobstructed light path to the screen, or when cable lengths between inputs and outputs are inadequate. Requiring the source device to be located near the projector often leads to compromises in device placement and presenter location which can affect display output and presentation quality.

Network projectors are quickly becoming popular display devices. In additional to providing any conventional signal inputs, they can receive their display content over the LAN. This allows source devices to be connected anywhere the network is available instead of directly wired to the physical projector. Network projector status and functional management can be operated remotely over the network by authorized devices. This effectively removes the requirement for line of sight remote control mechanisms to change configurations, display options, or power settings. Networking options thus allow far greater freedom for projector and source device placement within the conference room.

Network projectors are challenged in their ability to handle smooth playback of high definition video by increasing source content and output resolutions. Larger content data sizes and real-time video display requirements place high demands on the network throughput, projector processing power, and internal operating system support. In addition, source devices must also be configured for transmission of their content across a network. While it would be uncommon today for a laptop or PC to not be equipped with networking capabilities, operating system support of network display technologies has been slow to mature. This is in sharp contrast to the tight integration that generally exists between operating system graphical user interfaces (GUIs) and powerful graphics processing units on today's video cards which offer video signal outputs.

One technology that allows access to dynamic source content on a remote device over a network is called Virtual Network Computing (VNC) and provides a remote desktop sharing solution. With this approach, a client application on one PC connects to a host application on another PC. The host application is configured to iteratively provide the changing views of the entire operating system desktop and views of applications running on the host PC to the client application across the network for display on the client PC. Keyboard and mouse inputs on the client PC are redirected by the client application across the network to the host PC and function as inputs to the sharing session. A user on the client PC can thus view the remote host PC desktop and interact with it by operating his local keyboard and mouse devices.

Microsoft has designed several similar technologies that facilitate desktop sharing within their operating systems. Microsoft's Remote Desktop Services, for example, is optimized for the Windows® OS and provides thin-client terminal server computing, Remote Desktop, and more. This technology is evolving into new enterprise solutions replacing conventional PCs with thin-clients that can access virtually hosted user desktops on remote servers. Microsoft's rich Remote Desktop Protocol with new and upcoming RemoteFX features provides efficient and secure transmission of screen content across the network. Additional related solutions include Microsoft's Windows Desktop Sharing APIs (application programming interfaces) that can transmit desktop images to authenticated devices across the network. Some of these approaches follow a "push" model and are used by Microsoft Pictor, Remote Assistance, and Windows Meeting Space applications.

One primary use of a projector is to display a connected user's laptop screen. In an example business conference room environment, PCs/laptops are often physically brought and connected to a projector with a video cable to display source content. In a networked conference room environment, the PCs and projector are connected to a local area network and content is sent through the network to the projector for presentation. The user interacts with the laptop during his presentation while his desktop contents are continually forwarded to the projector and shown on the display surface. Compared with conventional video signal solutions, desktop content distribution across the network to a network projector is not a trivial task.

Though many application solutions have been developed to aid the data exchange process, each operates differently. EPSON's EasyMP® Network Projection technologies, for example, allows for the transfer of computer screen contents across the network for display output by the projector. However, this solution requires installation of many specialized drivers and application software on the host PC along with user setup and configuration of display and connection operations. The EasyMP software's internal techniques used to collect a computer's desktop data, which composes the screen contents, vary and have limited performance on different systems. This is in part due to restrictions within the computer operating system regarding access to screen contents by third-party applications and ever tightened coupling with graphics sub-systems. For example, the increased use of off-loading operating system rendering to advanced graphic hardware modules results in high-performance graphics operations but limits application exposure to native screen buffers which are stored on the graphics hardware and optimized for video signal output by the graphics card.

It can be argued that the operating system is best suited to collect and distribute native desktop GUI data since system services are integral to the window rendering processes. Microsoft does, for example, offer some native features in their current operating systems that allow a user to connect with a network projector to output desktop contents to a projected display. Once enabled, the operating system on the host PC transmits desktop contents to an authorized network projector. Unfortunately, the performance of Microsoft's solution is not as acceptable as a direct video connection to the graphics card. Microsoft's Remote Desktop technologies are another more suitable option since they offer better performance between networked devices. However, remote desktop solutions are all based on the use of a client PC or thin-client device to make the connection to the host. This usually requires a client-side keyboard and mouse for entering access credentials for authentication and user control of the session.

Conveniently, the internal design for a network projector can be, and often is, constructed around well-known embedded systems platforms which offer core hardware and operating system elements to a device vendor. Many of these platforms expose PC-like functionally and provide applications and common interface elements to aid the vendor in designing device specific features or interconnectivity. This frees the vendor from designing low-level elements, such as network stacks, IO and storage, or GUI components. Vendors can spend their time on device specific elements such as UI, configuration options, core display functionality, etc.

Some device system platforms, including Linux varieties or Microsoft Windows Embedded solutions, can natively support input peripherals including keyboards and mouse device connections. Projectors, however, typically do not expose such connections as they are not common for display hardware and generally unnecessary for typical control and interface operations. A few buttons on the projector (as with conventional monitors), a remote control provided with the projector, or network management solutions are typically used for device management. The nature of a projector's location within a room would make additional attached keyboard and mouse devices awkward or introduce yet another cabling concern. While wireless keyboard and mice could offer a solution, wireless range may be limiting, and the increased hardware costs to projector vendors and users are undesirable.

If a keyboard and mouse were present, the more advanced remote desktop solutions could be employed and make the network projector function more like a thin-client device. This would require the laptop user to change keyboard and mouse devices while operating with the projector device.

It would therefore be desirable to have the following features in a system that uses a projector: (a) users can utilize their own familiar keyboard and mouse/track-pad input devices; (b) network projector desktop retrieval and display performance as good as that offered by remote desktop solutions; and (c) automatic and limited software installation to achieve network projector operation. The present invention is directed to achieving these and other objectives.

SUMMARY OF INVENTION

The present invention provides a system for establishing a remote desktop connection between a client projector and a host computer, the client projector and the host computer being connected by a network. The system includes a private remote desktop service virtual channel between the host computer and the client projector. The client projector includes an input injection component that receives keyboard and mouse events from the host computer across the private remote desktop service virtual channel. In the client projector, a processor initiates a remote desktop connection process, and completes a remote desktop connection to the host computer. The input injection component injects a keyboard or mouse event received by the client projector into an operating system of the client projector, and the client projector further comprising a client application remote desktop connection that interprets the keyboard or mouse event as a valid input device event, and forwards the keyboard or mouse event to the host computer to actuate a graphical user interface of a remote desktop session.

In an embodiment, the client projector is signaled that the host computer is ready to accept a remote desktop connection and requests that a remote desktop connection be made. This signal can come from the processor of the host computer, from a user interface (e.g. a button on the client projector), or some other unit in the system.

In an embodiment, a processor in the client projector requests access credentials from the host computer and the host computer sends access credentials that are required for the remote desktop connection to the client projector. Alternately or additionally, the client projector includes a memory that stores usernames or passwords of the host computer that are required for the remote desktop connection. The usernames or passwords of the host computer can be stored in an encrypted form.

In a further embodiment, the client projector includes a web browser to securely provide access credential pages with a digital certificate to the host computer.

In an embodiment, the host computer includes an input device capture component that captures keyboard and mouse events and an input redirection component that transmits the captured keyboard and mouse events across the private remote desktop service virtual channel to the client projector.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

In a conventional remote desktop operation, a user is located at a client machine that is then used to access and control desktop contents on some host machine, possibly quite remote from the client location. Keyboard and mouse input devices at the client aid user control over the desktop sharing session while a client side display shows the hosted content sent from the host to the client.

The present invention changes and reverses key elements of this conventional remote desktop operation. First, the present invention assumes that the client and host are generally nearby one another (not so remote) and in the present invention, the user is placed at the host location (not at the client). For example, the user is a presenter using his laptop (host) in a conference room with a network projector (client). The present invention also assumes that the client may not provide input devices for the user. Next, in an embodiment, the host connects to the client to provide it with access credentials and request that the client initiate a normal remote desktop connection back to the host using such credentials. Alternatively, the client may already have the host credentials, for example from a previous remote desktop session with the host.

The client maintains and controls the remote desktop session in the typical fashion and displays the hosted desktop content it receives. Finally, the user interacts only with the host's keyboard and mouse input devices. The present invention securely redirects the host inputs to the client across the network that allows the client application to control and interact with the desktop sharing session. The user, operating with the host devices, appears to the client application to be located at the client and utilizing client-side input devices as in a conventional remote desktop configuration.

A network projector as described herein may be referred to as the client or the projector. This projector will provide a client-side application to a virtual network connection for displaying remote desktop content. A host as described herein is defined as a networked computer, laptop, or handheld device which can provide, among other things, the serving function in a virtual networking connection with the client. In an embodiment, the network projector incorporates a Windows embedded operating system providing Remote Desktop Connection client application support. The host is a networked computer that provides the server component of Microsoft's Remote Desktop Services, called Remote Desktop.

Figure 1:
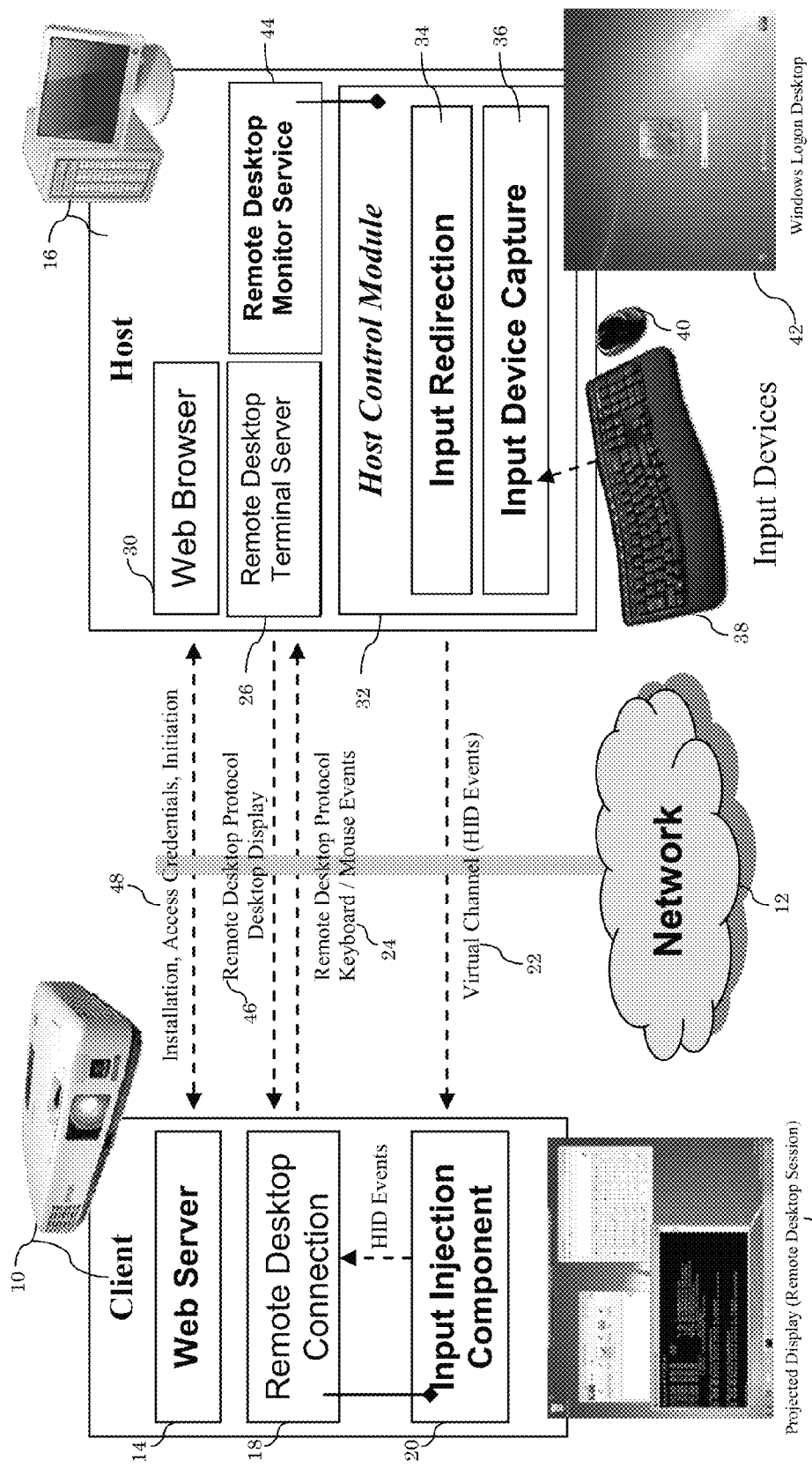
FIG. 1 is a general block diagram of the system of the present invention.

FIG. 1 is block diagram overview of the main components of the present invention. As discussed above, the client in the present invention is a network projector 10 that is connected to network 12. The network projector 10 (Client) has a Web Server component 14 that runs on projector 10 to provide an access interface for the host 16 to install necessary components and provides a way to initiate a remote desktop connection process. Hereinafter, network projector 10 will be referred to as client projector 10. As mentioned above, host 16 may be a networked computer as shown for example in FIG. 1, a laptop as shown for example in FIG. 2, or a handheld device. Host 16 will be generally referred to herein as host computer 16. In a preferred embodiment shown in FIG. 1, the client projector 10 incorporates a Windows embedded operating system providing Remote Desktop Connection 18 client application support.

The Input Injection Component 20 is a module that executes in the client projector 10 during a remote desktop connection. This module collects keyboard and mouse event data, i.e. Human Interface Device (HID) events, sent across the network using a secure remote desktop virtual channel 22. These HID events are injected (e.g. using an application programming interface (API) methods such as SendInput) into the client device's operating system which forwards them to the remote desktop client application. In turn, the remote desktop client application transmits similar events (Remote Desktop Protocol Keyboard/Mouse Events 24) between the Remote Desktop Connection 18 and the Remote Desktop Terminal Server 26 of host computer 16 and manipulates the hosted desktop in the remote desktop session. An example screen of the remote desktop session that is displayed by client projector 10 is shown as 28 in FIG. 1.

The host computer 16 has a conventional Web Browser 30 such as Internet Explorer, Firefox, Google Chrome, Safari, etc.

The Host Control Module 32 of host computer 16 contains an Input Device Capture Component 36 and an Input Redirection Component 34. The Input Device Capture Component 36 executes in the interactive Window's Logon session as it has access to the physical HID devices (i.e. keyboard 38 and mouse 40) of the host computer 16. An example screen of the Window's Logon desktop is shown as 42 in FIG. 1. Using conventional low-level keyboard and mouse hooks, e.g. SetWindowsHookEx (WH_MOUSE_LL, WH_KEYBOARD_LL), the raw input device event data is obtained. These events are placed onto an outbound queue as they are collected.

An optional GUI window may be provided to indicate control of the session. A button to start hooking and take control of device events may be exposed to the user. Events occurring over the window interface may be adjusted prior to placement on the outbound queue. For example, mouse position could be adjusted to reflect some normalized or relative distance within the window boundaries.

Input Redirection Component 34 of Host Control Module 32 locates the hosted remote desktop session and opens a server-side remote desktop services virtual channel 22 endpoint. Events in the outbound queue from Input Device Capture Component 36 are removed and transmitted by this module across the network using the remote desktop virtual channel 22 APIs. The virtual channel connection is maintained during the lifetime of the remote desktop session and data is protected by the same security protocols as the remote desktop protocol.

The Remote Desktop Monitor Service 44 is a service module that runs on the host computer 16 in Windows Session 0. Typically this service is installed and running before a remote desktop session has been established. The service module's primary role is to detect the remote desktop connection and presence of a Window's remote desktop session. When it has been determined that the Windows Logon desktop has been enabled in station Winsta0 of for the user session, the service begins an application launch process.

The application launch process loads and executes a Host Control Module 32 application into the Windows Logon desktop in station Winsta0 of the user session.

Like any Windows service, this module has a start and stop method. A timer event for detection polling or a waiting thread is used to begin the detection check mechanism. The detection mechanism enumerates the active Windows Terminal Service sessions using WTSEnumerateSessions with the WTS_CURRENT_SERVER_HANDLE option to find an active WTS session id. If one does not exist, the detection check method ends until another retry interval at later time.

Next the detection mechanism obtains the active console session id for comparing with the Window's Logon process session using WTSGetActiveConsoleSessionId method. Since the Window's Logon process runs as SYSTEM in the user's session, the current process token privilege must next be elevated to SW_DEBUG_NAME to allow similar execution rights. The detection mechanism then enumerates all running processes in the system.

After enumeration, the detection mechanism searches for processes matching the name of the Window's Logon application (winlogon.exe). If the process is found and it matches the active console session id obtained earlier, then the Windows Logon process for the active remote desktop session has been properly detected. An application launching process opens the found process token and executes the Host Control Module application into the found process session desktop via a CreateProcessAsUser function.

Figure 2:
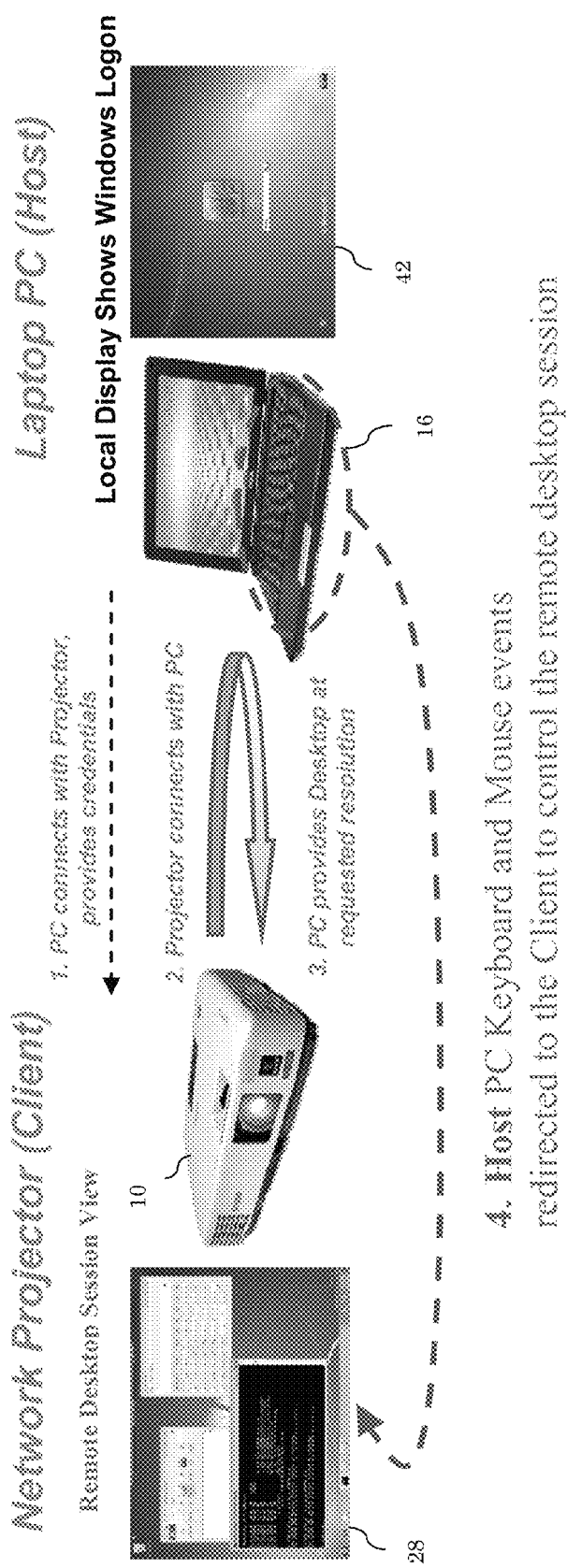
FIG. 2 illustrates the general steps of the method of the present invention.

The following is a discussion of the method of the present invention, which is shown in general steps (1-4) in FIG. 2. The method starts with the client projector 10 and host computer 16 (laptop) connected to a local area network.

Host Connects to Client (Laptop 16 to Projector 10)

The process begins (step 1, FIG. 2) when the host user (individual operating his laptop) wishes to output his desktop on the client display (output of projector 10) and signals the host to connect to the client across the network. The ultimate goal of this initial connection is to inform the client that the host is ready to accept a remote desktop connection and requests that such connection to be made. It may also provide the client with access credentials and configuration settings 48 (FIG. 1) for the connection. Alternately, the client may already have the access credentials and configuration settings of the host, for example from a previous remote desktop session with the host. Also, alternately, the client may be informed, i.e. signaled, that the user is ready to begin a remote desktop session by a user interface, e.g. a button on the client projector.

Accessing the Client

The user may be provided with the network address of the client projector 10 in advance to aid this step. Alternately, a discovery process such as Windows Discovery Protocol may be used to locate the client projector 10 address on the network from the host computer 16. An operating system may provide this function or include an alternate method to connect to the network client projector 10. Sometimes identification is automatic and client network projectors appear in lists of available network devices within the file system.

In an embodiment, the client projector 10 is equipped with a Web Server 14 (FIG. 1) whose pages can be accessed through a typical host side web browser 30. The user opens his web browser and enters the projector address. In some operating systems, like Microsoft's Vista® an "Open Projector" function is available next to a network device icon for each identified projector in the network file system. Selection of this function effectively opens a web browser with the address of the selected device.

In an alternate embodiment, a custom application or driver previously installed and available on the host computer 16 could provide a connection to a network client projector 10 that is setup to receive the custom connection.

Host Component Installation

The Web Server 14 allows the client projector 10 to identify the host requesting the pages. It also provides a way to convey instructional information to a user regarding the upcoming desktop sharing session. The user may select among web page operations or even choose to abort further communication processes.

When selected within the web page interface, or by automatic determination, software components utilized by this method of the present invention may be installed on the host computer 16. Of course, these components could be preinstalled onto the host computer 16 or already exist from a prior installation that required them. For example, the client projector 10 web pages could use an ActiveX control mechanism with a download function to initiate installation of software modules onto host computer 16 that are required for the present invention's desktop sharing functions. Alternately, installation could occur using a variety of other methods and outside this connection process, including links to external download sites for installation components, DVD media, or related mechanisms.

In one embodiment, an installation button is provided on the web page that can initiate an ActiveX control guided installation process.

Client Gathers Host Remote Access Credentials

Next, the web interface provided by the client projector 10 may ask for the access credentials from the user of host computer 16, such as a username and password, in order to access Remote Desktop services on the network connected host computer 16. And, if it cannot be obtained automatically, the address of the host may also be requested.

In one embodiment, the web server in the client projector 10 is configured to securely provide access credential pages with a digital certificate using HTTPS, or SSL based connection. This allows the host user to securely send username and password content to the projector which will only be temporarily stored and used to access the host from the client with Remote Desktop Connection services.

In an alternate embodiment, usernames or passwords or both may be previously configured and stored in an encrypted form on the client projector 10 for later lookup. An alternate user key, associated with the stored username and password, may be instead queried on the web page and supplied into the interface by the host computer 16 to instruct the client projector 10 to lookup and use the stored values with the target host address.

Client Connects to Host (Projector 10 to Laptop 16)

As shown generally as step 2 in FIG. 2, once client projector 10 has secured the host computer 16 user's remote access credentials, the client projector initiates the remote access desktop connection process and completes the remote access desktop connection to the host computer 16. This is accomplished without exposing any initial client side user GUI querying connection details as those details have already been provided through web page interfaces. For example, in a Windows® CE based network projector, the projector executes Microsoft's remote desktop connection client application (i.e. cetsc.exe) and provides the access credentials on the command line and in configuration files along with any other configuration options gathered by the web interface component.

Once established, this remote desktop connection provides the client application with views of desktop of the host computer 16 provided across the network (shown generally as step 3 in FIG. 2). The display output path in the client projector 10 projects such views 28 onto a projection display surface.

Client Loads Injection Component

As part of the connection process within the Microsoft remote desktop connection client application, this present invention provides a dynamic link library that is loaded and enables a private remote desktop service virtual channel 22 between the client projector 10 and the Remote Desktop Terminal Server 26 on the host computer 16. Alternately, a similar private communications channel could be constructed through another independent application layer loaded at the time of remote desktop connection. However, implementing a remote desktop services virtual channel allows data to flow between the client and host with the same encryption and security paths as Microsoft's remote desktop protocol 46.

The client projector 10 virtual channel handler is Input Injection Component 20 equipped to receive keyboard and mouse events from across the network in virtual channel 22. These events are typically provided by a related host process (e.g. Host Control Module 32). When a keyboard or mouse event is received, it is placed into the client's operating system using API methods such as SendInput which inject the event into the system event queues as if generated by a local hardware device. The Windows remote desktop connection client interprets these events as valid input device events and forwards them across the remote desktop connection to the host computer 16 to actuate the remote desktop session's GUI accordingly.

Host Begins Remote Desktop Session

When a remote desktop connection is established between the client projector 10 and the host computer 16, a remote desktop session is created on the host computer 16 to support the connecting user. The host computer 16 changes the active user's desktop to the Window's Logon (winlogon) Desktop of interactive station Winsta0. The interactive window station, Winsta0, is the only window station that can display a user interface or receive user input. Local host devices are unavailable to the remote desktop session being served by the host as they are provided to the Logon Desktop 42. The remote desktop session on the host computer 16 is provided with a virtual mouse and keyboard device that come from the Remote Desktop Connection 18.

In the method of the present invention, a Remote Desktop Monitor Service module 44 is installed and activated on the host computer 16. This service module detects when a remote desktop connection is established and a remote desktop session is created. When detected, the Remote Desktop Monitor Service module 44 launches a Host Control Module 32 application into the Window's Session containing the active user's Window's Logon screen. This Host Control Module 32 application performs two operations. First, it establishes a server-side remote desktop services virtual channel 22 (using Input Redirection Component 34) to communicate with the client projector's virtual channel endpoint for the active remote desktop connection. Next, it hooks low-level keyboard and mouse device events using native methods such as SetWindowsHookEx to capture input events (using Input Device Capture Component 36). Alternately, it may capture the mouse and display an application event window. Keyboard filters may detect certain key combinations or the application window may provide GUI elements to control when or how keyboard and mouse events are captured.

As the keyboard and mouse events are hooked and captured in the running Input Device Capture Component 36, they are provided (according to filters or settings) to the Input Redirection Component 34 managing a virtual channel server endpoint. The Input Redirection Component 34 transmits the events across the virtual channel 22 to the client projector's Input Injection Component 20 endpoint running in client projector 10 where they are received and injected into the client projector's operating system. This is shown generally as step 4 in FIG. 2. Client application Remote Desktop Connection 18 receives injected keyboard and mouse events from the operating session and executes them in the remote desktop session as if they were local hardware devices.

Therefore, using the keyboard 38 and moving the mouse 40 on the host computer 16 will control the remote desktop session and affect the output of the session projected by client projector 10.

Figure 3:
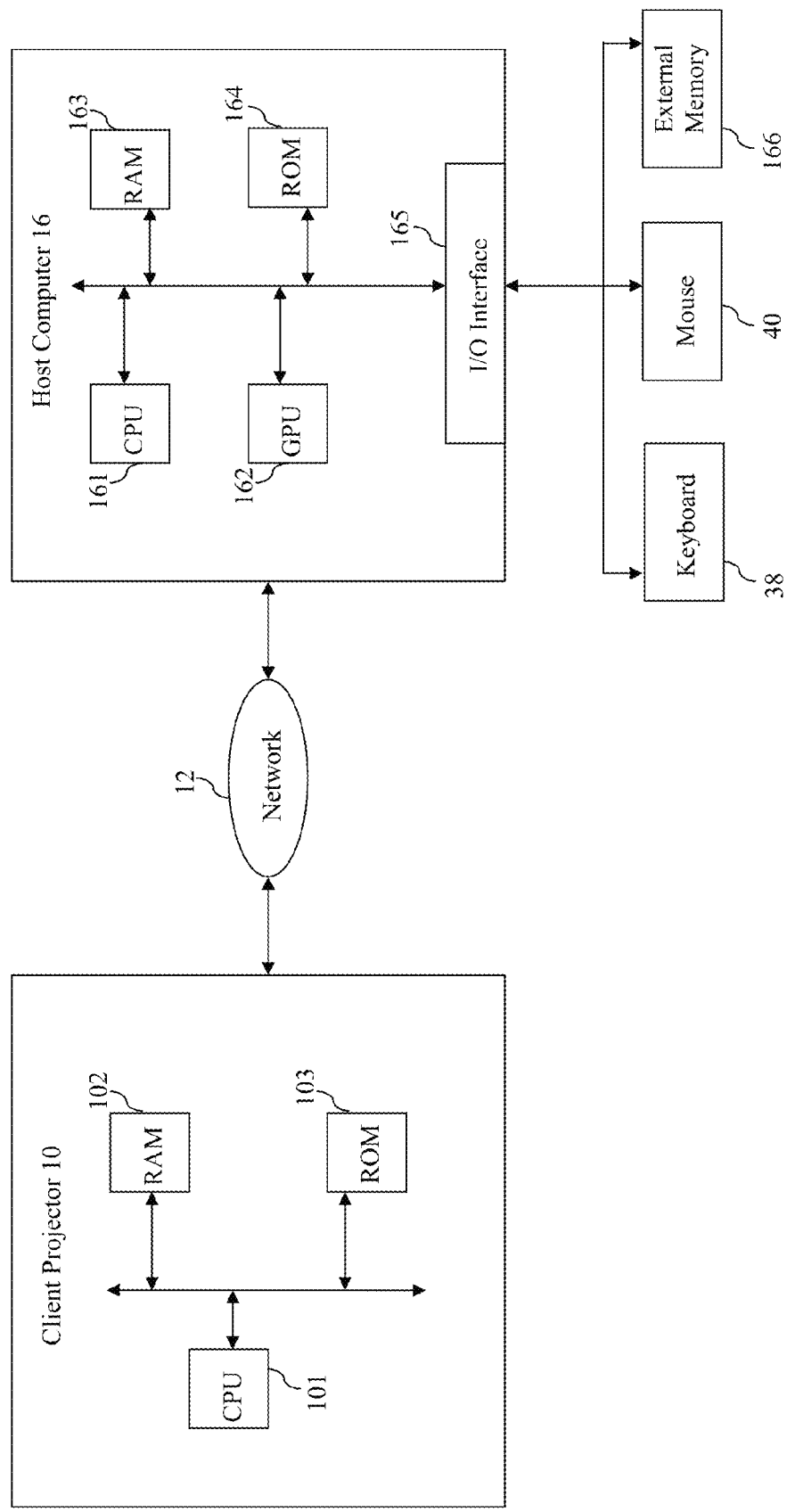
FIG. 3 is a simple block diagram of the processors and memory of the host computer and client projector of the present invention.

The method steps of the present invention described above are preferably performed by one or more processors in the host computer 16 and/or the client projector 10 executing computer-executable instructions, programs, software, firmware, that is stored or loadable in memory in host computer 16 and/or client projector 10 and/or in accessible external memory. FIG. 3 is a very simplified block diagram illustrating generally the processors and memory in host computer 16 and client projector 10. Host computer 16 processors may include, for example, a central processing unit (CPU) 161 and one or more graphical processing units (GPU) 162. The internal memory may include, for example, RAM 163 and ROM 164. I/O interface 165 enables communication with keyboard 38, mouse 40, and external memory 166, for example. Client projector 10 may similarly include a CPU 101, RAM 102, and ROM 102.

Various embodiments can be implemented in digital electronic circuitry, or in computer hardware, firmware, software, or in combinations of them. Apparatus can be implemented in a computer program product tangibly embodied in a non-transitory machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims. For example, in one embodiment, a GUI application window is provided to allow the host user to configure, start, and stop the host device capture and transmission process. There may be a button to start or stop mouse capture/control, for example. In another embodiment, a particular keystroke or mouse button operation or combination could determine when mouse capture should stop (as when the host user wishes to use the mouse for the Logon screen GUI). In another embodiment, capture could stop after a specified or predetermined elapsed period of event inactivity. In another embodiment, all components are stopped and uninstalled from the client when the capture application GUI is exited or the user logs back into his desktop from the Logon screen. In another embodiment, the projector client may be enabled to connect with and receive keyboard and mouse inputs from another PC across the network which is not the same PC hosting the remote desktop.

What is claimed is:

1. A method for establishing a remote desktop connection between a client computing device and a host computer, the client computing device and the host computer being connected by a network, comprising:

providing a projector as said client computing device, said projector being a client projector configured to execute a client-side application to establish a remote desktop session with said host computer;

providing said host computer, said host computer being configured to execute a serving function in said remote desktop session with said client projector, said host computer having a host image display and a host-input device for receiving host-user inputs;

establishing a remote desktop session between the client projector and the host computer over said network, said remote desktop session being characterized by the following limitations:

(a) a one-to-one remote desktop connection between the client projector and the host computer;

(b) said host computer executing a logon desktop, and as part of said remote desktop session, exclusively displaying said logon desktop on the host image display and directing all host-user inputs from the host-input device exclusively to said logon desktop;

(c) said host computer executing a user desktop separate and secure from the logon desktop, transferring control of the user desktop running on the host computer to the client projector, and transferring the user desktop over said network directly to said client projector for display by said client projector, said user desktop being a hosted desktop;

(d) said hosted desktop on the host computer being configured to be controlled by the client projector by receiving client-input-device signals from the client projector;

establishing a private, remote desktop service, virtual channel between the host computer and the client projector on said network;

in response to the establishing of the remote desktop session, launching a host control module that intercepts and captures host-user inputs signals from said host-input device that are directed to said logon desktop, and redirects the captured host-user inputs through the virtual channel to the client projector; and in response to receiving the redirected host-user input signals from the host computer, the client projector resending the received host-user input signals over said network back to the hosted desktop on the host computer as said client-input-device signals from the client projector to control the hosted desktop running on said host computer as if the received host-user input signals were generated at the client projector by a client-input device connected to the client projector.

2. The method as in claim 1 wherein in the client projector:
the host-input signals received from the host computer are injected into an operating system of the client projector;
the received host input signals are interpreted as valid input device events local to the client projector, and forwarded back to the host computer over said network and avoiding said virtual channel to actuate a graphical user interface of the hosted desktop on the host computer.

3. The method as in claim 1 further comprising:
using the host computer to instruct the client projector to request a remote desktop connection with the host computer.

4. The method as in claim 3, wherein:
as part of using the host computer to instruct the client projector to request a remote desktop connection with the host computer, the host computer sends to the client projector access credentials including a username and password needed for establishing the remote desktop session; and
in the client projector, using the username and password received from the host computer to send a request for the remote desktop session to the host computer.

5. The method as in claim 4, wherein:
the client projector includes a web server providing a webpage accessible from the host computer and through which a user at the host computer provides the access credentials using a host computer web browser; and
said host-input device is a computer keyboard, and said client projector has a lack of any computer keyboard.

6. The method as in claim 5, wherein:
the webpage is a an access credential page; and
the web server in the client projector is configured to securely provide the access credential page with a digital certificate to the host computer.

7. The method as in claim 4, comprising:
storing in the client projector the username and password sent from the host computer; and
on a subsequent instruction from the host computer to the client projector instructing the client projector to request a remote desktop connection with the host computer, the host client projector using the stored username and password without necessitating that the access credentials be resent anew by the host computer.

8. The method as in claim 3, further comprising:
as part of using the host computer to instruct the client projector to request a remote desktop connection with the host computer, sending a network address of the host computer to the client projector.

9. The method as in claim 1, wherein said host-input device is a computer mouse, and said client projector has a lack of any computer mouse.

10. One or more tangible, non-transitory computer-readable media embodying instructions executable by a computer to perform the method of claim 1.

11. The method as in claim 1, wherein said host computer has a plurality of said host-input devices including a computer keyboard and a computer mouse, and said client projector has a lack of any computer keyboard or computer mouse.

12. A system for establishing a remote desktop connection between a client computing device and a host computer, the client computing device and the host computer being connected by a network, comprising:

a projector as said client computing device, said projector being a client projector configured to execute a client-side application to establish a remote desktop session with said host computer;

said host computer being configured to execute a serving function in said remote desktop session with said client projector, said host computer having a host image display and a host-input device for receiving host-user inputs;

a remote desktop session established between the client projector and the host computer over said network, said remote desktop session being characterized by the following limitations:

(a) a one-to-one remote desktop connection between the client projector and the host computer;

(b) said host computer executing a logon desktop, and as part of said remote desktop session, exclusively displaying said logon desktop on the host image display and directing all host-user inputs from the host-input device exclusively to said logon desktop;

(c) said host computer executing a user desktop separate and secure from the logon desktop, transferring control of the user desktop running on the host computer to the client projector, and transferring the user desktop over said network directly to said client projector for display by said client projector, said user desktop being a hosted desktop;

(d) said hosted desktop on the host computer being configured to be controlled by the client projector by receiving client-input-device signals from the client projector;
a private, remote desktop service, virtual channel on said network between the host computer and the client projector; and
wherein in the host computer, in response to the remote desktop session being established, launching a host control module that intercepts and captures host-user inputs signals from said host-input device that are directed to said logon desktop, and redirects the captured host-user inputs through the virtual channel to the client projector; and
in response to receiving the redirected host-user input signals from the host computer, the client projector resending the received host-user input signals over said network back to the hosted desktop on the host computer as said client-input-device signals from the client projector to control the hosted desktop running on said host computer as if the received host-user input signals were generated at the client projector by a client-input device connected to the client projector.

13. The system as in claim 12, wherein in the client projector:
the host-input signals received from the host computer are injected into an operating system of the client projector;
the received host input signals are interpreted as valid input device events local to the client projector, and forwarded back to the host computer over said network avoiding said virtual channel to actuate a graphical user interface of the hosted desktop session.

14. The system as in claim 13, wherein said host-input device is a computer keyboard, and said client projector has a lack of any computer keyboard.

15. The system as in claim 12 wherein:
the host computer to instructs the client projector to accept a remote desktop connection with the host computer.

16. The system as in claim 15 wherein:
the client projector further comprises a memory that stores the username and password sent from the host computer; and
on a subsequent instruction from the host computer to the client projector instructing the client projector to request a remote desktop connection with the host computer, the host client projector uses the stored username and password without necessitating that the access credentials be resent anew by the host computer.

17. The system as in claim 15 wherein:
as part of the host computer instructing the client projector to request a remote desktop connection with the host computer, the host computer sends to the client projector access credentials including a username and password needed for establishing the remote desktop session; and
in the client projector, the username and password received from the host computer are used to send a request for the remote desktop session to the host computer.

18. The system as in claim 17 wherein the client projector further comprises a web server providing an access credential webpage with a digital certificate to the host computer through which a user at the host computer provides access credentials using a host computer web browser, said access credentials including a username and password needed for establishing the remote desktop session.

19. The system as in claim 12, wherein said host-input device is a computer mouse, and said client projector has a lack of any computer mouse.

20. The system of claim 12, wherein said host computer has a plurality of said host-input devices including a computer keyboard and computer mouse, and said client projector has a lack of any computer keyboard or computer mouse.

* * * * *